United States Patent [19]

Knauer

[11] Patent Number: 4,839,849
[45] Date of Patent: Jun. 13, 1989

[54] RIPPLE-CARRY ADDER

[75] Inventor: Karl Knauer, Grafing, Fed. Rep. of Germany

[73] Assignee: Siemens Aktiengesellschaft, Berlin and Munich, Fed. Rep. of Germany

[21] Appl. No.: 902,745

[22] Filed: Sep. 2, 1986

[30] Foreign Application Priority Data

Sep. 30, 1985 [DE] Fed. Rep. of Germany ....... 3534892

[51] Int. Cl.⁴ .................................................. G06F 7/50
[52] U.S. Cl. .......................................................... 364/784
[58] Field of Search ................................. 364/784–788

[56] References Cited

U.S. PATENT DOCUMENTS

| | | | |
|---|---|---|---|
| 3,843,876 | 10/1974 | Fette et al. | 364/786 |
| 4,052,604 | 10/1977 | Maitland et al. | 364/786 |
| 4,417,314 | 11/1983 | Best | 364/785 |
| 4,425,623 | 1/1984 | Russell | 364/786 |
| 4,439,835 | 3/1984 | Best et al. | 364/786 |
| 4,564,921 | 1/1986 | Suganuma | 364/784 |
| 4,592,007 | 5/1986 | Ohhashi | 364/784 |
| 4,601,007 | 7/1986 | Uya et al. | 364/784 |
| 4,689,763 | 8/1987 | Fang | 364/784 |

OTHER PUBLICATIONS

Integrierte MOS–Schaltungen by H. Weiss & K. Horninger, Springer–Verlag 1982 pp. 188–195.

Primary Examiner—Gary V. Harkcom
Assistant Examiner—Long Thanh Nguyen
Attorney, Agent, or Firm—Hill, Van Santen, Steadman & Simpson

[57] ABSTRACT

An adder cell for a ripple-carry adder, suitable for use in an integrated circuit employing CMOS technology, has a gate arrangement for two input variables and a carry input signal, with outputs for sum and carry signals, in accordance with the signals presented to the inputs. The gate arrangement is arranged so that the charging of the capacitance of the carry output takes place from a supply voltage through two transistor gates, not contained in a combination gate, so that one of the transistor gates may be formed as a driving inverter separate from the time-critical carry-propogation path, and designed with significantly lower impedance than the other transistor gates. Alternatively, a single transistor gate is employed for charging the capacitance of the carry output directly form a supply voltage.

4 Claims, 1 Drawing Sheet

RIPPLE-CARRY ADDER

RELATED APPLICATION

A related application is Knauer Application Ser. No. 902,641, filed Sept. 2, 1986.

BACKGROUND

The present invention relates to an adder cell for a ripple-carry adder and more particularly to such a cell which may be executed in CMOS technology as an integrated circuit.

Adders are required in a large number of digital logic circuits, for example in digital filters, signal processors, and microprocessors. A principle for such an adder is the ripple-carry method, in which a carry signal is serially transmitted from an adder cell for a lower-order bit to the adder cell for the next higher order bit. The addition time is defined essentially by the time required for the carry propagation. More involved adder arrangements such as, for example, the look-ahead carry method are based on the ripple-carry method.

Ripple-carry adder cells are known, for example, from H. Weiss, K. Horninger, "Intergrierte MOS-Schaltungen", Springer-Verlag, Berlin-Heidelberg, New York (1982), pp. 188–194. Such adders cells are affected by the disadvantage that the carry path, which is a critical determinant of overall computing time of an arithmetic unit constructed with such cells, either has a relatively large number of serially connected gates, or else the gates are components of combination gates. In the former case, the large number of serially connected gates has an unfavorable effect on the propagation time of carry signals. In the second case, there may be the additionally unfavorable fact that the charging of the capacitance of the carry output does not take place with the required edge steepness, due to the relatively high impedance of the gates fashioned as component parts of combination gates.

BRIEF DESCRIPTION OF THE INVENTION

A principal object of the present invention is to provide an adder cell of the ripple-carry type, in which the disadvantages of known adder cells are effectively avoided and in which the circuit complexity is considerably reduced so that less space is required for an integrated circuit incorporating the adder cell.

This object is realized in the present invention by an an adder cell having a gate arrangement such that the capacitance of the carry output is charged through two transistor gates which are not contained in a combination gate so that one of the gates can be designed with significant lower-impedance, without limitation due to the geometry of the integrated circuit containing such cell.

In another arrangement, this object is attained by employing a single transistor for charging the capacitance of the carry output which is not contained in a combination gate go that it can be designed with significantly lower-impedance.

These and other objects and advantages of the present inventon will become manifest by an inspection of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
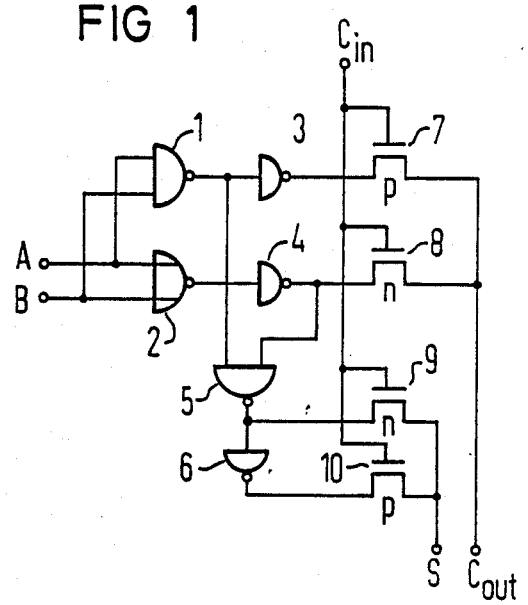
FIG. 1 is a schematic diagram of a first exemplary embodiment of the present invention.

Referring to FIG. 1, the adder cell in accordance with a first exemplary embodiment of the invention incorporates a gate arrangement for two variables identified as A and B, with a carry input $C_{in}$, and with sum and carry output terminals S and $C_{out}$.

Two input terminals for the variables A and B are respectively connected to inputs of a first NAND gate 1 and to a NOR gate 2. The output of the NAND gate 1 is connected to the input of a single transistor gate 3, acting as an inverter, and to one input of a further NAND gate 5. The output of the NOR gate 2 is connected to the input of another transistor gate 4 acting as an inverter. The output of the gate 3 is connected to the source electrode of the single transistor gate 7, shown as a p-channel FET, and acting as a transfer gate. The output of gate 4 acting as an inverter is connected to the source electrode of another transistor gate 8, shown as an n-channel FET and acting as a transfer gate. The output of the gate 4 is also connected to a second input of the NAND gate 5.

The drain electrodes of the two transistor gates 7, 8 are connected in common to the output terminal for the carry output $C_{out}$. The output of the NAND gate 5 is connected to the source electrode of a further transistor gate 9 shown as an nchannel FET and acting as a transfer gate. The output of the NAND gate 5 is also connected to the input of a further transistor gate 6 acting as an inverter and this output is connected to the source electrode of a further transistor gate 10, shown as a p-channel FET and acting as a transfer gate. The drain electrodes of the two transistor gates 9 and 10 are connected in common to the output terminal for the sum signal S. The gate electrodes of all of the transistor gates 7–10 are connected in common to the input terminal for the carry input signal $C_{in}$.

In the arrangement of FIG. 1, the charging of the capacitance of the carry output at the outputs of the gates 7 and 8 proceeds from a supply voltage source through the series connected gates 3 and 7, or the series connected gates 4 and 8. The gates 3 and 4 are formed as driving inverters and are not inserted in the time-critical carry propagation path. These driving inverters can be designed with significantly lower-impedance than the transistor gates 7 and 8, and can be designed larger in size, without restriction due to the layout geometry, because they are not in the time critical carry path. This enables a circuit of FIG. 1 to achieve a significantly faster carry propagation.

The circuit of FIG. 1 requires only 22 transistors, which is a considerable savings in comparison to 28 transistors typically used in conventional adder cells. Similar to conventional designs, the carry output is supplied via a series connection of two transistors. However in the apparatus of FIG. 1, contrary to previous designs, the series connected gates are not contained in a combination gate. Thus, the driving inverters, not within the time-critical carry path, can be designed with substantially lower-impedance than the following transfer gates 7 and 8, without encountering any difficulties in layout geometry of an integrated circuit incorporating the adder cell. Essentially four transistor gates affect charging of the load capacitance, corresponding to a conventional adder cell incorporating 28 transistors.

The arrangement of FIG. 1 is particularly well suited for adders having only a few adder cells (for example two). When a large number of adder cells is employed, there is a potential for incorrect operation, since the threshold voltages of the transistors in the carry path are cumulative. This disadvantage is overcome with the arrangement of FIG. 2.

Figure 2:
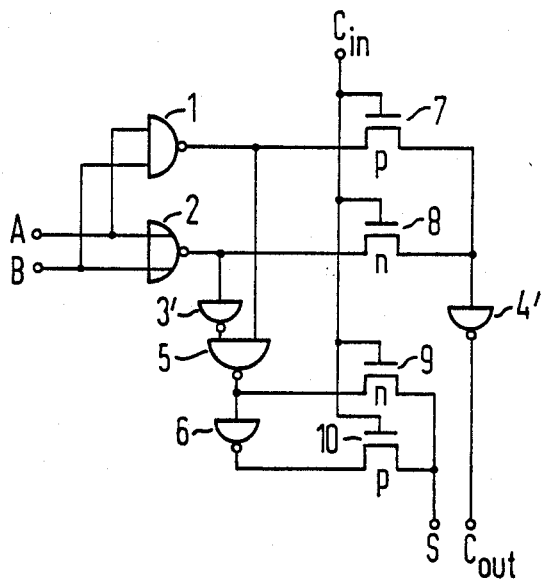
FIG. 2 is a schematic diagram of a second exemplary embodiment of the present invention.

In FIG. 2 the input terminals for the two variables A and B are respectively connected to inputs of a first NAND gate 1 and of a NOR gate 2. The output of NAND gate 1 is connected to the source electrode of a first transistor gate 7, shown as a p-channel FET and acting as a transfer gate. The output of the NAND gate 1 is also connected to one input of a further NAND gate 5.

The output of the NOR gate 2 is connected to the source electrode of a transistor gate 8 shown as an n-channel FET and acting as a transfer gate. The output of the NOR gate 2 is also connected to the input of a further transistor gate 3', which acts as inverter. The output of the gate 3' is connected to the second input of the NAND gate 5. The output of the NAND gate 5 is connected to the source electrode of a third transistor gate 9, shown as a n-channel FET and acting as a transfer gate, and is also connected to the input of a further transistor gate 6 acting as an inverter. The output of the gate 6 is connected to the source electrode of a fourth transistor gate 10 shown as a p-channel FET and acting as a transfer gate. The drain electrodes of the transistor gates 7 and 8 are connected in common to the input of a transistor gate 4', acting as a driving inverter. The output of the gate 4' is connected to the output terminal for the carry output $C_{out}$. The drain electrodes of the transistor gates 9 and 10 are connected to the output terminal for the sum signal S. The gate electrodes of all transistor gates 7–10 are connected in common to the input terminal for the carry input signal $C_{in}$.

In the arrangement of FIG. 2, the voltage drop caused by the threshold voltages of the transistors, noted above in connection with FIG. 1, is eliminated, by the inverter 4' which is inserted into the carry path, such inverter not being a component part of a combination gate and therefore being capable of being designed with lower-impedance. The design of the inverter 4' is also free of difficulties with respect to layout geometry. Due to its low-impedance, a fast charging of the capacitance of the output carry is produced, up to its maximum voltage.

The arrangement of FIG. 2 comprises a gate arrangement in which the charging of the capacitance of the carry output takes place over a single transistor gate 4', proceeding from a supply voltage source. The arrangement of FIG. 2, like that of FIG. 1, requires only 22 transistors in comparison with the 28 transistors used in previous arrangements. Therefore, the circuits of the present invention require less space when embodied in integrated circuit designs.

It is apparent that various modifications and additions may be made in the apparatus of the present invention, without departing from the essential features of novelty thereof, which are intended to be defined and secured in the appended claims. For example, the gate arrangements of the two described embodiments may be modified in accordance with the rules of Boolean algebra.

What is claimed is:

1. An adder cell for a ripple-carry adder suitable for complementary metal oxide semiconductor technology and having output capacitance, said adder cell has a voltage supply and comprising a gate arrangement for accepting two input variables and an input carry signal, and for supplying sum and carry output signals to a pair of sum and carry output terminals, in accordance with said inputs, said gate arrangement establishing a carry propagation path connecting said carry input signal to said carry output terminal, said gate arrangement comprising, in combination, first and second transistor gates connected in series, with the output of said first gate connected to the input of said second gate and the output of said second gate being connected to said carry output terminal, whereby the output capacitance of said adder cell is charged from said voltage supply through said two transistor gates, both of said first and second transistor gates having a single data input, said first transistor gate comprising a driving inverter not in series with said carry propagation path, and having a lower impedance than said second gate, whereby the size of said first gate is not affected by the layout geometry of said adder cell in an integrated circuit, and means for connecting said second gate to receive said input carrying signal.

2. An adder cell according to claim 1, wherein said gate arrangement includes a first NAND gate having inputs connected to receive said two input variables, a NOR gate having inputs connected to receive said two input variables, a first inverter, means for connecting the output of said first NAND gate to the input of said first inverter, a second NAND gate, means for connecting the output of said first NAND gate to a first input of said second NAND gate, a second inverter, means for connecting the output of said NOR gate to the input of said second inverter, a first transfer gate comprising a p-channel field effect transistor (FET) having its source electrode connected to the output of said first inverter, a second transfer gate comprising an n-channel FET and having its source electrode connecting to the output of said second inverter, means connecting a second input of said second NAND gate to the output of said second inverter, means for connecting the drain electrodes of said two transfer gate to a terminal for manifesting the carry output signal, a third transfer gate comprising an n-channel FET having its source electrode connected to the output of said second NAND gate, a fourth transfer gate comprising a p-channel FET having its source electrode connected to the output of said second NAND gate through a third inverter, means for connecting the drain electrodes of said third and fourth transfer gates to a terminal for manifesting the sum output signal, and means for connecting the gate electrodes of all of said transfer gates to receive the input carry signal.

3. An integrated circuit incorporating an adder cell for a ripple-carry adder suitable for complementary metal oxide semiconductor technology comprising, said adder cell a gate arrangement with a plurality of gates for accepting two input variables and an input carry signal and for supplying sum and carry sum and carry output signals to a pair of output terminals in accordance with said inputs, said gate arrangement having two carry propagation paths, each comprising, in combination, a single-transistor gate having its output connected to said carry output terminal to charge the capacitance of said carry output terminal from a voltage supply, said single-transistor gate having a single data input, said single-transistor gate having a lower impedance than other gates of said plurality of gates in said gate arrangement, whereby the size of said single-transistor gate is not affected by the layout geometry of said adder cell in an integrated circuit.

4. An adder cell according to claim 3, wherein said gate arrangement includes a first NAND gate having inputs connected to receive said two input variables, a NOR gate having inputs connected to receive said two input variables, a first transfer gate comprising a p-channel field effect transistor (FET) having its source electrode connected to the output of said first NAND gate, a second transfer gate comprising an n-channel FET having its source electrode connected to the output of said NOR gate, means for connecting the drain electrodes of both of said first and second transfer gates to the input of said single-transistor gate, a second NAND gate having one input connected to the output of said first NAND gate and the other input connected to the output of said NOR gate through an inverter, a third transfer gate comprising an n-channel FET having its source electrode connected to the output of said second NAND gate, a fourth transfer gate comprising a p-channel FET having its source electrode connected to the output of said second NAND gate through an inverter, means for connecting the drain electrodes of said third and fourth transfer gates to the sum output terminal, and means for connecting the gate electrodes of all of said transfer gates in common to receive said input carry signal.

* * * * *